(No Model.)
S. MÜLLER.
COOKING APPARATUS.
No. 430,394.  Patented June 17, 1890.
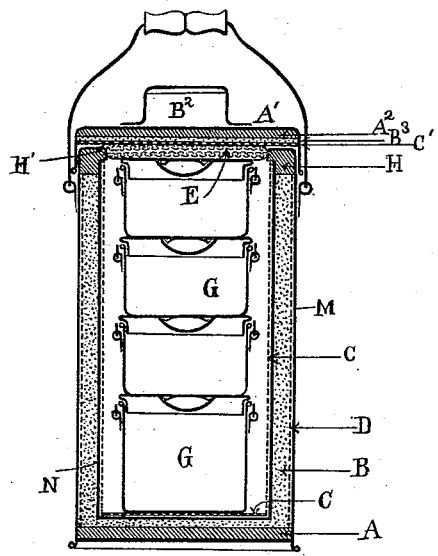
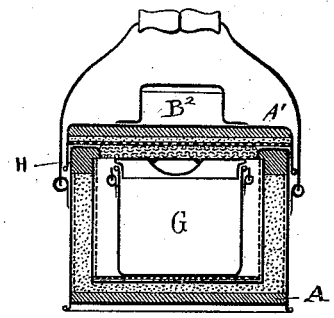
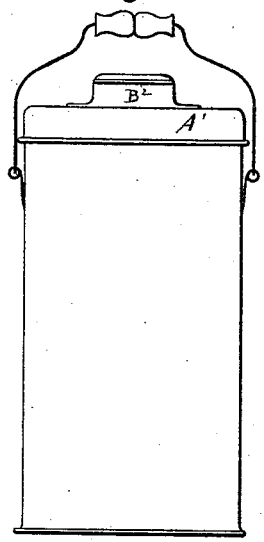
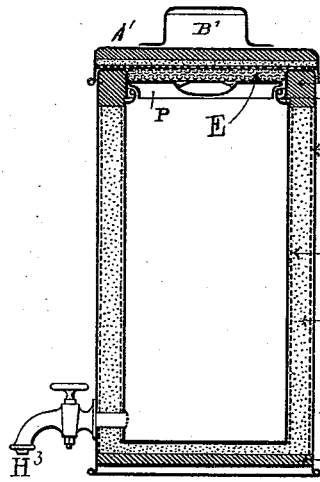
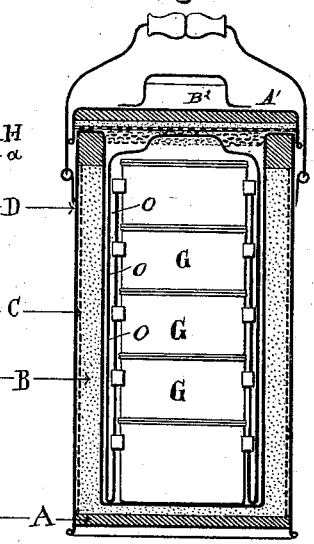
Witnesses:
Henry Huber
Carl Kay
Inventor
Susanna Müller
by Gorpel & Raegener
Attorneys
THE NORRIS PETERS CO., PHOTO-LITHO., WASHINGTON, D. C.

UNITED STATES PATENT OFFICE.

SUSANNA MÜLLER, OF AUSSERSIHL, ZURICH, SWITZERLAND.

COOKING APPARATUS.

SPECIFICATION forming part of Letters Patent No. 430,394, dated June 17, 1890.

Application filed December 19, 1888. Serial No. 294,127. (No model.) Patented in France September 7, 1886, No. 178,375; in Italy January 22, 1887, XLI, 349; in Austria-Hungary May 27, 1887, No. 2,153 and No. 24,362; in Belgium December 15, 1888, No. 84,152, and in Switzerland March 23, 1889, No. 318.

*To all whom it may concern:*

Be it known that I, SUSANNA MÜLLER, a citizen of the Republic of Switzerland, residing at Aussersihl, Zurich, Switzerland, have invented a new and useful Portable Self-Cooking Apparatus with Isolated Jars, (for which I have obtained Letters Patent in France, No. 178,375, dated September 7, 1886; in Italy, Vol. 41, No 349, R. A., dated January 22, 1887; in Austria-Hungary, Nos. 2,153 and 24,362, dated May 27, 1887; in Belgium, No. 84,152, dated December 15, 1888, and in Switzerland, No. 318, dated March 23, 1889,) of which the following is a specification.

This invention relates to improvements in vessels for keeping and transporting hot cooked victuals, or victuals that are not completely cooked and the cooking of which is completed by the heat of the victuals themselves while in said vessels.

In the accompanying drawings, Figure I is a vertical transverse sectional view of my improved portable isolated jar, showing a number of dishes in the same. Fig. II is a vertical transverse sectional view of a jar containing a single dish. Fig. III is an elevation of a jar. Fig. IV is a vertical transverse sectional view of a jar as constructed to receive coffee or other liquids. Fig. V is a vertical transverse sectional view of the jar and a series of dishes in the same connected to a strap or band for carrying them.

Similar letters of reference indicate corresponding parts.

The cylindrical vessel M is made of sheet metal and provided with a wooden bottom A and a wooden top ring H, having an internal flange H'. The metal forming the vessel M is carried up over the outer edge and top of the ring H and over the inner edge of the flange H'. A smaller vessel N, made of sheet metal, is placed within the vessel M, and the space between the two vessels is filled with cotton, silk, or woolen waste, mineral wool, asbestus, or any other non-conductor of heat. The upper edge of the inner vessel N abuts against the bottom of the flange H' and is secured to the inner side of the ring H. There is thus no metallic connection with the exterior vessel M and the interior vessel N, so that the cold cannot be transmitted from the outer side to the inside of the jar or receptacle thus formed.

Before applying the non-conducting filling B a lining D, of oil-cloth or like material, is applied on the inner surface of the outer vessel M. The inner vessel is provided on its inner surface with a lining C of felt. The cover A' is made of sheet metal and provided with a flange fitting over the top of the vessel M, and is also provided with a handle B². A wooden piece A² fits in the cover, and between the same and the felt layer C a filling B³, of non-conductible material, is provided. A feather cushion E, having a woolen covering, is secured to the under side of the cover and fits in the top opening of the inner vessel N. The victuals are placed into dishes G, of which one rests upon the other, as shown in Fig. 5. Said dishes may be connected by means of a strap O to facilitate lifting them out.

In case the device is to be used for receiving or transporting coffee, tea, milk, or other liquids which are to be kept hot, it is provided at the bottom with a cock H³ for drawing off said liquid. The inner felt lining of the inner vessel is dispensed with, but an outer oil-cloth lining C is provided in place thereof, as shown in Fig. 4. The cover is provided with a projection P on its under side, which can rest against a rubber packing-ring a, cemented in an outwardly-projecting part in the top of the inner vessel. All kinds of victuals can be placed into the dishes and can be kept hot in the same for quite a long time, and thus can be transported without loosing any of their wholesomeness or nutritiveness. As the non-conducting material is reduced in quantity as much as possible, the heat in these jars or receptacles is not so great as to cause all the victuals placed therein to be cooked to a pulpy mass; but nevertheless the heat is sufficient to complete the thorough cooking of such victuals without requiring more heat from any external source. Coffee or tea placed into the vessel shown in Fig. 4 is not only kept warm and palatable, but also retains all its aroma.

I am aware that metal vessels have been placed into wooden or other metal vessels and a layer of insulating metal placed between the two vessels for the purpose of keeping the contents of the inner vessel warm or hot; but this I do not claim broadly.

Having thus described my invention, I claim as new and desire to secure by Letters Patent—

1. A receptacle for keeping or transporting victuals, composed of two sheet-metal vessels, one within the other, a wooden bottom for the outer vessel, a wooden ring uniting the upper edges of the two vessels, a layer of material between the two vessels, which material is non-conductive of heat, and a cover having a lining of wood and non-conducting material, substantially as set forth.

2. In a receptacle for storing and transporting victuals, the combination, with the exterior vessel M and the interior vessel N, of the layer B, of material non-conductive of heat, between said vessels, the wooden bottom A, the wooden top ring H, the cover $A^2$, provided with a filling of wood, and a feather cushion E, having a woolen lining, substantially as set forth.

3. In a receptacle for keeping and transporting victuals, the combination, with the two metal vessels M and N, of the wooden bottom A, the top ring H, having an internal flange H', the metal of the exterior vessel being carried over the top of said ring, and a cover for said vessel, substantially as set forth.

In testimony whereof I have signed this specification in the presence of two subscribing witnesses.

SUSANNA MÜLLER.

Witnesses:
OTTO HUTZLOS,
PAULINA GRÄETIG.